(12) United States Patent
Savoie-Lavigueur

(10) Patent No.: US 12,604,872 B2
(45) Date of Patent: Apr. 21, 2026

(54) ACTUATED FISHING LURE

(71) Applicant: Guillaume Savoie-Lavigueur,
Coteau-du-lac (CA)

(72) Inventor: Guillaume Savoie-Lavigueur,
Coteau-du-lac (CA)

(73) Assignee: Guillaume Savoie-Lavigueur,
Coteau-du-lac (CA)

( * ) Notice: Subject to any disclaimer, the term of this
patent is extended or adjusted under 35
U.S.C. 154(b) by 0 days.

(21) Appl. No.: 17/806,495

(22) Filed: Jun. 12, 2022

(65) Prior Publication Data

US 2025/0049010 A1     Feb. 13, 2025

(30) Foreign Application Priority Data

Apr. 26, 2022     (CA) ...................................... 3160374

(51) Int. Cl.
*A01K 85/00* (2006.01)
*A01K 85/16* (2006.01)
*F03G 7/06* (2006.01)

(52) U.S. Cl.
CPC .......... *A01K 85/16* (2013.01); *A01K 85/1811*
(2022.02); *A01K 85/1837* (2022.02); *F03G*
*7/0614* (2021.08)

(58) Field of Classification Search
None
See application file for complete search history.

(56) References Cited

U.S. PATENT DOCUMENTS

| | | | |
|---|---|---|---|
| 323,599 A | 8/1885 | Rundell | |
| 2006/0000137 A1* | 1/2006 | Valdivia y Alvarado | ................... A01K 85/00 43/42.2 |
| 2008/0271358 A1* | 11/2008 | Meroney | ................ A01K 85/00 43/26.2 |
| 2015/0216153 A1* | 8/2015 | Tsybulnyk | ............. A01K 85/00 |
| 2017/0181417 A1 | 6/2017 | Tsybulnyk | |
| 2019/0380321 A1* | 12/2019 | Heines | ................... A01K 85/01 |
| 2024/0000055 A1* | 1/2024 | Heines | ................... A01K 85/00 |

OTHER PUBLICATIONS

El Naggar, Shape memory alloy heat activation: State of the art
review , Dec. 3, 2020, AIMS Materials Science (Year: 2020).*

* cited by examiner

*Primary Examiner* — Joshua J Michener
*Assistant Examiner* — Henry Hooper Mudd

(57) ABSTRACT an animated fishing lure is, generally disclosed. The fishing
lure includes a shape memory alloy (SMA) actuator system,
a lure body and a controller. The shape memory alloy (SMA)
actuator system is generally positioned within the lure body
and includes a flexible non-compressive base and an actua-
tor wire made of SMA located on either side of the base.
Each actuator wire is connected to a controller. Inducing
electrical current through the actuator wires generates heat
and results in a contraction of the wire. The tension gener-
ated by wire contraction act on the flexible non-compressive
base causing it to bend. By alternating electrical currents
through each of the actuator wires the lure is alternatively
bent from a right bent position to a left bent position
repeatedly creating an oscillating motion.

17 Claims, 11 Drawing Sheets

ACTUATED FISHING LURE

TECHNICAL FIELD

The technical field generally relates to lures for fishing, and more specifically to actuated lures for fishing.

BACKGROUND

Lures are used in fishing activity to mimicate a live pray (bait) in order to attract and catch fish. Many different types of lures may be used.

In fishing activity fishing lures are commonly used. Conventional passive fishing lure typically includes a lure body which is either made of soft material (softbait) or hard material (hardbait) attached to the tip of fishing line and one or multiple hooks which each can be made of single point (mono hook) up to three points (treble hooks). Unfortunately, the two types of lure typically used required relative motion from the lure to the water in which it is submerge to generate a motion of the lure, causing them to be unusable for some fishing methods as static line technique or tip-up fishing during winter ice fishing.

Actuated fishing lures use rotating element such as electric motor and one or more linkages to actuated the lure motion located internally or externally to the lure body which is submerge in water. Unfortunately, available actuated fishing lures usually involve a relatively large number of parts, and/or are complex and/or expensive to manufacture, and/or have limited lifetime.

There is therefore a need for a lure which will overcome at least one of the above-identified drawbacks.

SUMMARY

According to one aspect there is provided an animated fishing lure, comprising: a means of animation of the lure with an actuator system; and a lure body retaining the said animation means.

In one embodiment, the actuator system includes: a base member; at least one actuating element mechanically connected to base member and disposed aside, parallel to the base and electrically connected to an electrical power source; a controller electrically connected between the actuating element and the electrical power source; and an activation circuit electronically connected to the controller allowing the system be activated or deactivated externally from the body.

In one embodiment, the base member is made of a non-conductive flexible material that is incompressible. For example, the base member includes a plate.

In one embodiment, the actuating elements are made of a material that shares the properties of the shape memory alloy (SMA) materials.

In one embodiment, the actuating elements are elongate shape memory alloy (SMA) elements in the form of a wire or other extruded shapes.

In one embodiment, the means of animation of a fishing lure includes electrically powering the actuating elements in alternative intervals whereby the said elements combined with the base member being flexible but incompressible, actuates the said lure body therefore animating thereof.

In one embodiment, the electrical power source is retained by the said body.

In one embodiment, the electrical power source is retained externally to the said body.

In one embodiment, the electrical power source is retained near fishing rod reel area.

In one embodiment, the electrical power source is retained by an object attached to the fishing line used as additional weight for the lure.

In one embodiment, the controller is retained by the said body.

In one embodiment, the controller is retained externally to the said body. The said controller can be but is not limited to being retained near fishing rod reel area.

In one embodiment, the controller is retained near fishing rod reel area.

In one embodiment, the controller is retained by an object attached to the fishing line used as additional weight for the lure.

In one embodiment, the means of animation of the lure lacks any components needing to be in rotational movement.

According to another aspect there is also provided an animated fishing lure, comprising: a means of animation of the lure with an actuator system; and a lure body retaining the said animation means, the actuator system including: a base member electrically connected to an electrical power source; a controller electrically connected between the said base member and the said electrical power source; and an activation circuit electronically connected to the controller allowing the system be activated or deactivated externally to the said body.

In one embodiment, the base member is made of a non-conductive flexible material that is incompressible.

In one embodiment, the base member is made of a material that shares the properties of the shape memory alloy (SMA) materials.

In one embodiment, the base member is powered with electrical current causing it to deforms from a first position to second position. By repeatedly alternating the base member shape, the base member actuates the said lure body therefore animating thereof.

In one embodiment, the electrical power source is retained by the said body.

In one embodiment, the electrical power source is retained externally to the said body.

In one embodiment, the electrical power source is retained near fishing rod reel area.

In one embodiment, the electrical power source is retained by an object attached to the fishing line used as additional weight for the lure.

In one embodiment, the controller is retained by the said body.

In one embodiment, the controller is retained externally to the said body. The said controller can be but is not limited to being retained near fishing rod reel area.

In one embodiment, the controller is retained near fishing rod reel area.

In one embodiment, the controller is retained by an object attached to the fishing line used as additional weight for the lure.

In one embodiment, the means of animation of the lure lacks any components needing to be in rotational movement.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

Although the embodiments of the electrically animated fishing lure and corresponding parts thereof consist of certain geometrical configurations as explained and illustrated herein, not all of these components and geometries are essential and thus should not be taken in their restrictive sense. It is to be understood, as also apparent to a person skilled in the art, that other suitable components and cooperation thereinbetween, as well as other suitable geometrical configurations, may be used for the electrically animated fishing lure), as will be briefly explained herein and as can be easily inferred herefrom by a person skilled in the art.

Referring first to FIGS. 1 to 6, there is provided an animated fishing lure 1, used as a fishing rigging setup generally meant to be used with a fishing rod, the fishing rod not shown, in accordance with one embodiment. The animated fishing lure 1 including a shape memory alloy (SMA) actuator system 8, a lure body 2 and a controller 12. The lure body 2 could be any shape including of a minnow, a shad, a mullet, a grub, a worm, a leech, a crayfish, a shrimp, an eel or any other lure shape that a skilled person would consider to be suitable for use with the present animated fishing lure 1.

Figure 5A:
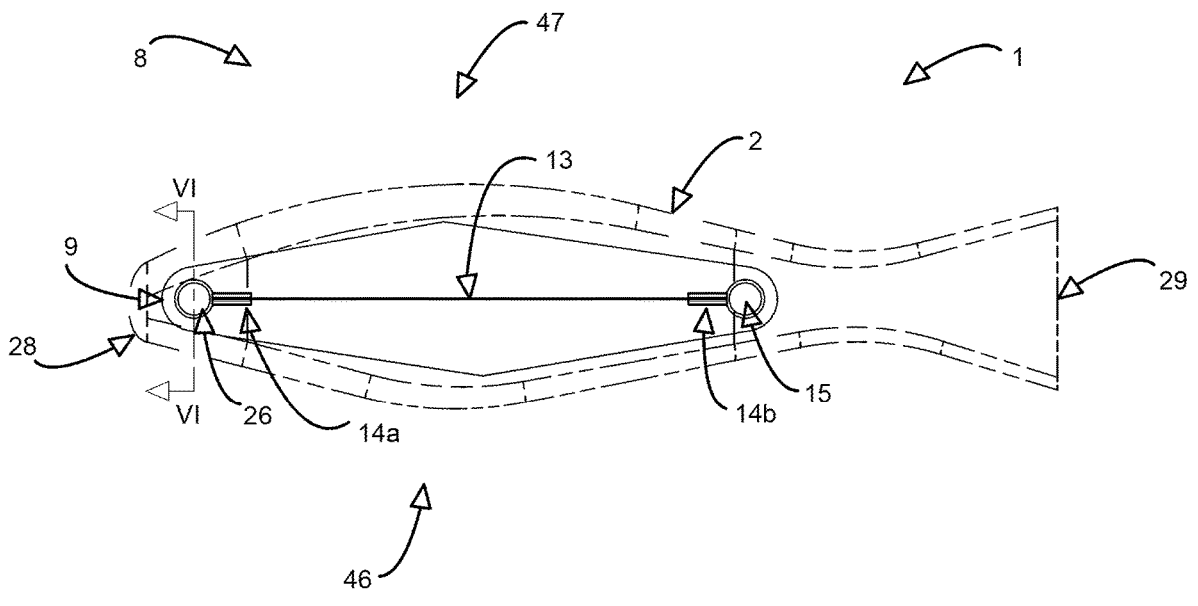
FIG. 5A is a right-side view of fishing lure assembly illustrated in FIG. 4A.
Figure 5B:
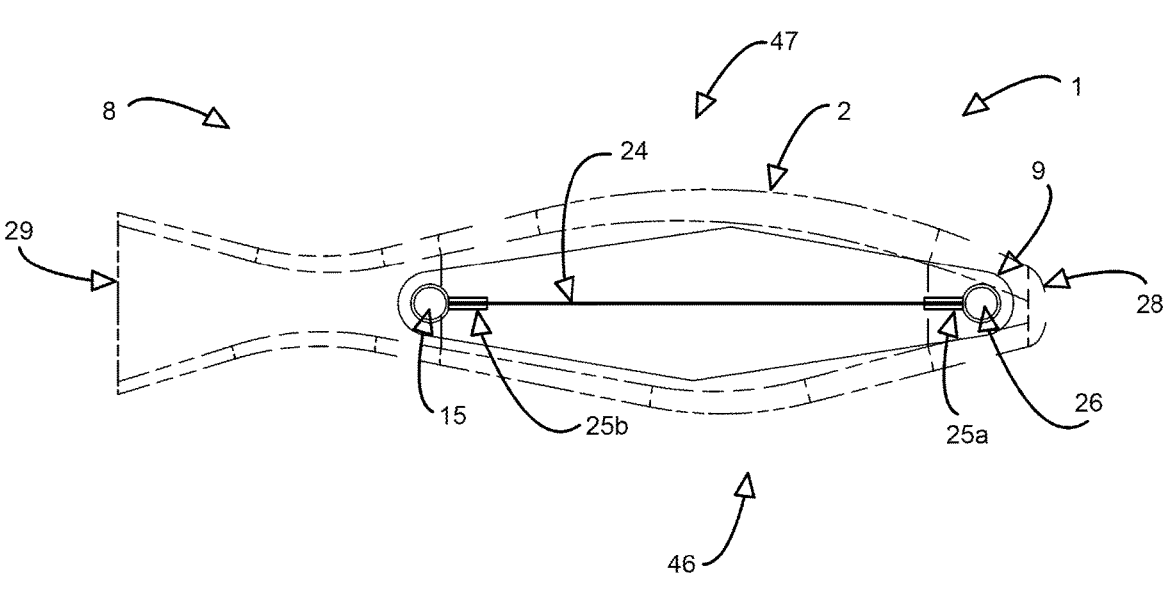
FIG. 5B is a left-side view of fishing lure assembly illustrated in FIG. 4A.

The shape memory alloy (SMA) actuator system 8 is comprised within the lure body 2 and includes a flexible non-compressive base 9, an actuator wire 13 located right side of the flexible non-compressive base 9 and an actuator wire 24 located on the lure left side of the flexible non-compressive base 9. As best shown in FIG. 5A, the actuator wire 13 is attached on either side to an actuator wire attachment 14a and 14b respectively attached to the actuator wire attachment 14a on the side of the lure head 28 and to the actuator wire attachment 14b on the side of the lure tail 29. Each actuator wire attachment 14a and 14b are respectively assemble to the flexible non-compressive base 9 by rivet 26 on the side of the lure head 28 and by rivet 15 on the side of the lure tail 29. As best shown in FIG. 5B, the actuator wire 24 is attached on either side to an actuator wire attachment 25a and 25b respectively attached to the actuator wire attachment 25a on the side of the lure head 28 and to the actuator wire attachment 25b on the side of the lure tail 29. Each actuator wire attachment 25a and 25b are respectively assemble to the flexible non-compressive base 9 by rivet 26 on the side of the lure head 28 and by rivet 15 on the side of the lure tail 29. In this example the flexible non-compressive base 9 is made of plastic but can be made of any other non-conductive, non-compressive and flexible material such as but not limited to: polycarbonate, acrylic, rubber, composites, paper or any polymers.

Figure 6:
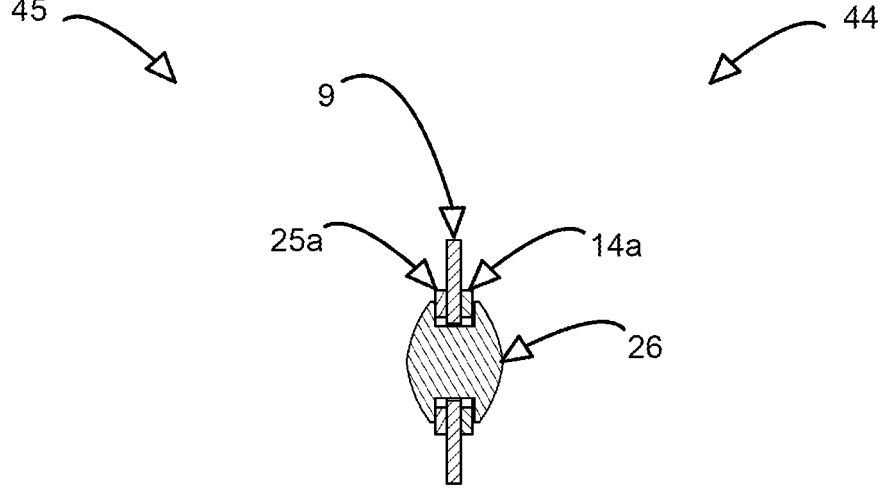
FIG. 6 is a cross-section view, taken along line VI-VI, of the fishing lure assembly as illustrated in FIG. 5.

FIG. 6 shows a section view taken from FIG. 5A where it is possible to see the rivet 26 is attaching both actuator wire attachments 14a and 14b respectively on both right side and left side of the flexible non-compressive base 9. In the proposed embodiment, both rivets 15 and 26 are made of plastic but can be made of any non-conductive material such as but not limited to: glass, rubber, porcelain, ceramic and paper. Both rivets 15 and 26 can alternatively be replaced by other means as screws, bolt and nut, glue, weld or any other attachment method a skilled person would consider to be suitable for use.

Figure 1:
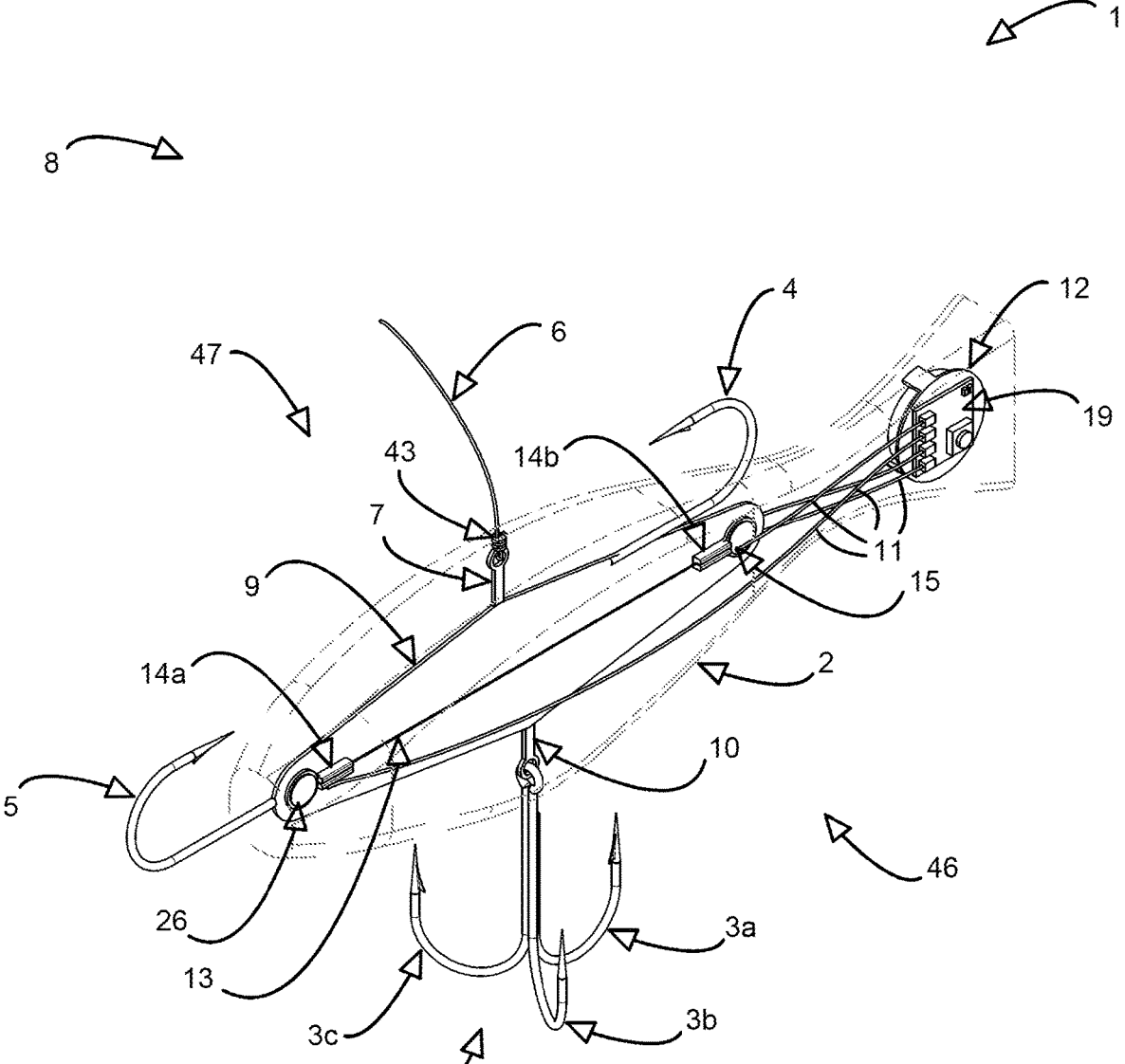
FIG. 1 is a top front perspective view of a fishing lure assembly including a lure body and an actuation system, in accordance with one embodiment.
Figure 2:
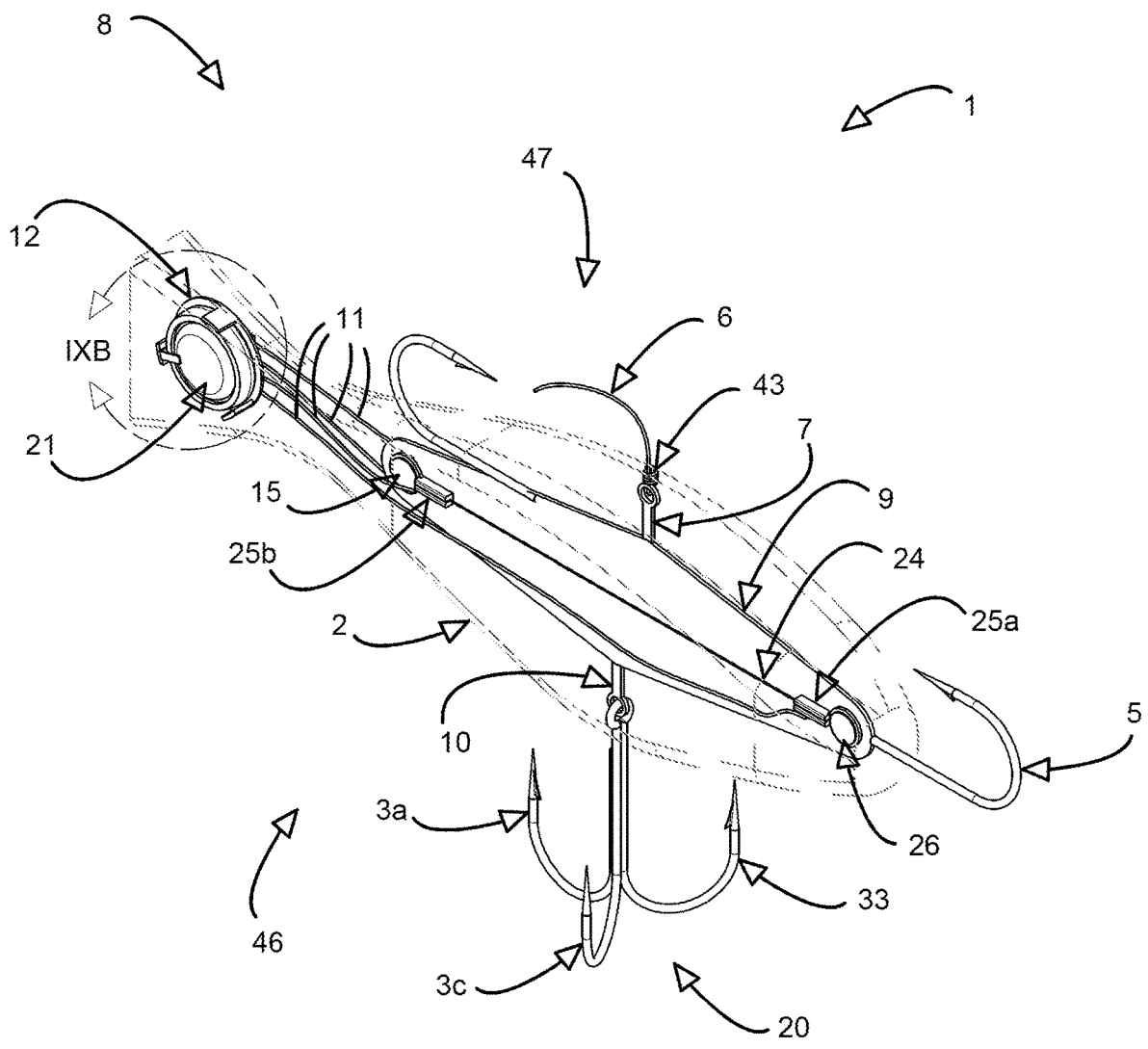
FIG. 2 is a top front elevation view of the fishing lure assembly including a lure body and an actuation system.
Figure 3:
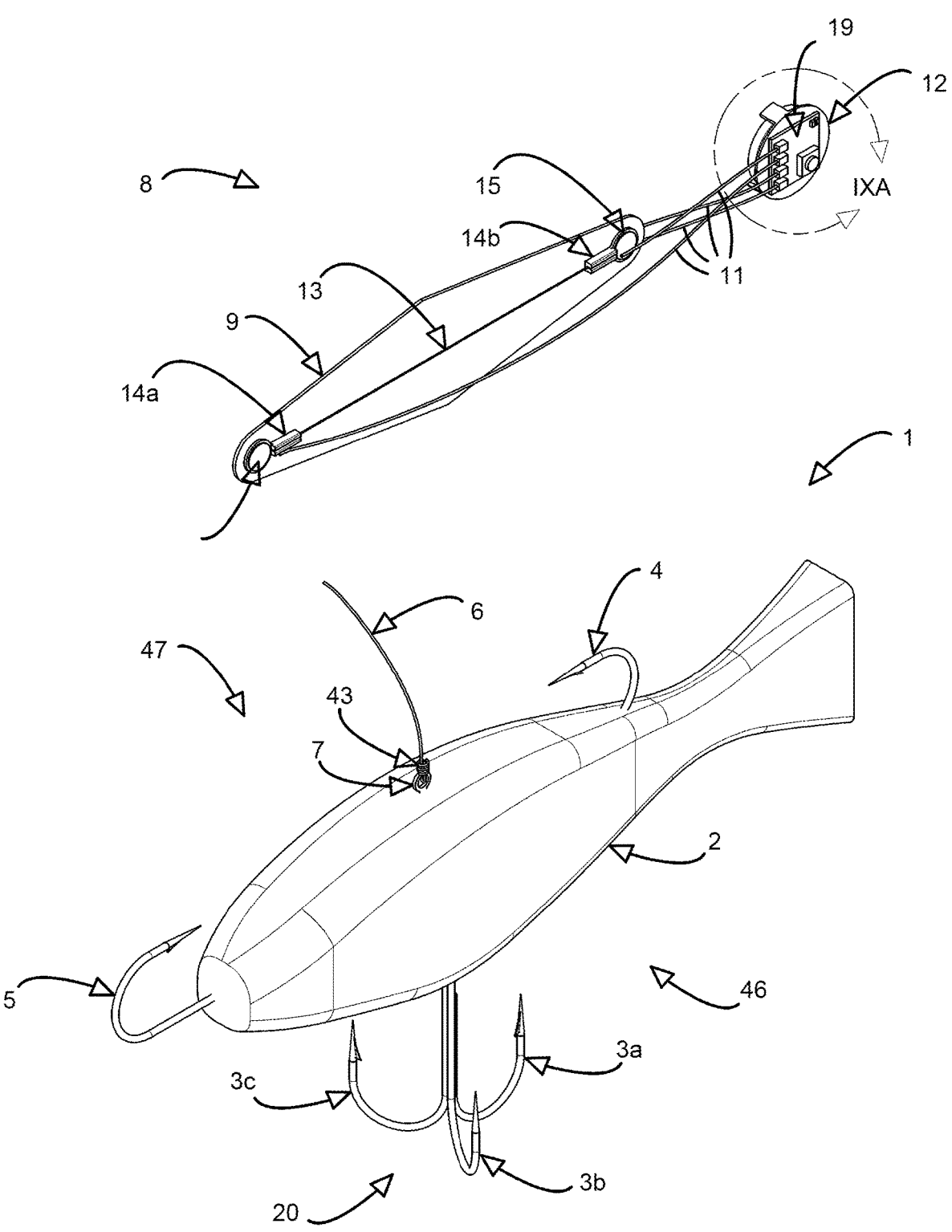
FIG. 3 is an exploded perspective view of fishing lure assembly

As best shown in FIGS. 1 to 3, each actuator wire attachments 14a, 14b, 25a and 25b are connected to a controller 12 by electrical conductors in this example connected by electrical wires 11. Each actuator wire 13 and 24 are made of a shape memory alloy (SMA) or any other material that shares at least one of the properties of the shape memory alloys (SMA). The said shared property includes to have the capacity to be deformed when cold but return to its pre-deformed shape when heated; the element undergoing transition from martensite state to austenite state upon heating and from austenite state to martensite state upon cooling. The actuator wires 13 and 24 could also be replaced by any shape or SMA elements as example: strips or extrusions.

Figures 4A, 4B, 4C:
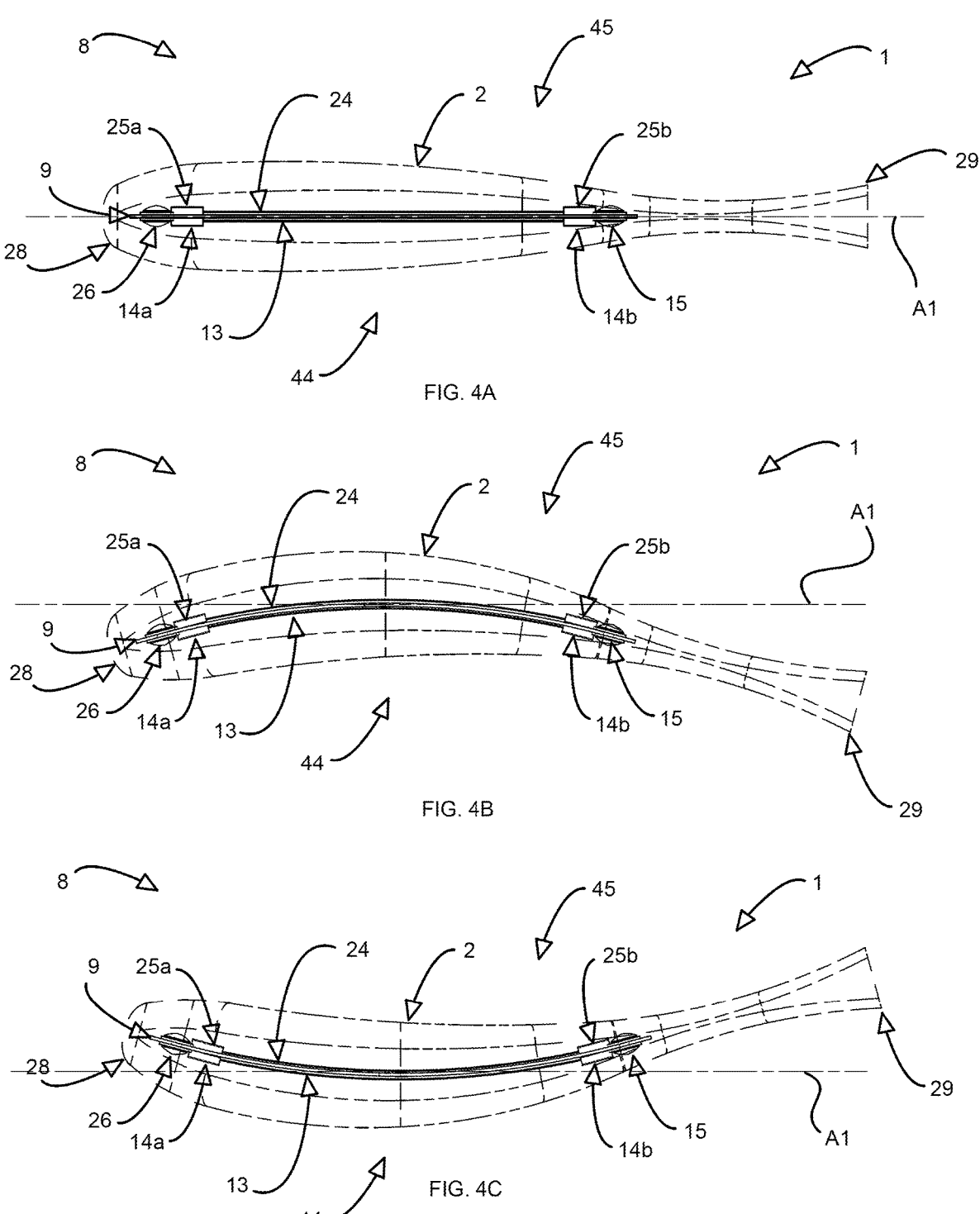
FIG. 4A is a top view of the fishing lure assembly illustrated in FIGS. 1, 2 and 3, with controller and wires removed, in a non-actuated position.
FIG. 4B is a top view of the fishing lure assembly illustrated in FI. 4A, in a right actuated position.
FIG. 4C is a top view of the fishing lure assembly illustrated in FI. 4A, in a left actuated position.

Referring to FIG. 4A to 4C, inducing an electrical current through of the actuator wires 13 generates heat due to the wire electrical resistance. The heat generated by the electrical current result in a contraction of the wire (reduction of the wire length) and therefore generating tension in the actuator wire 13. The tension generated by wire contraction act on the flexible non-compressive base 9 causing it to bend toward the right side 44 as best seen in FIG. 4B. Opposingly, inducing an electrical current through of the actuator wires 24 also generates heat. The heat generated by the electrical current results in a contraction of the wire (reduction of the wire length) and therefore generating tension in the actuator wire 24. The tension generated by wire contraction act on the flexible non-compressive base 9 causing it to bend toward the left side 45 as best seen in FIG. 4C. When neither or the actuator wires 13 and 24 are energized, the lure 1 return to a straight position as shown in FIG. 4A. By alternating electrical currents through the actuator wires 13 and 24 at a given intervals each said elements are alternatively heated and contracted bending the animated fishing lure 1 from a right bent position showed in FIG. 4B to a left bent position shown in FIG. 4C repeatedly creating an oscillating motion whereby the animated fishing lure 1 is imitating a live fish or any other live animal or reptile it is meant to imitate.

Figure 7:
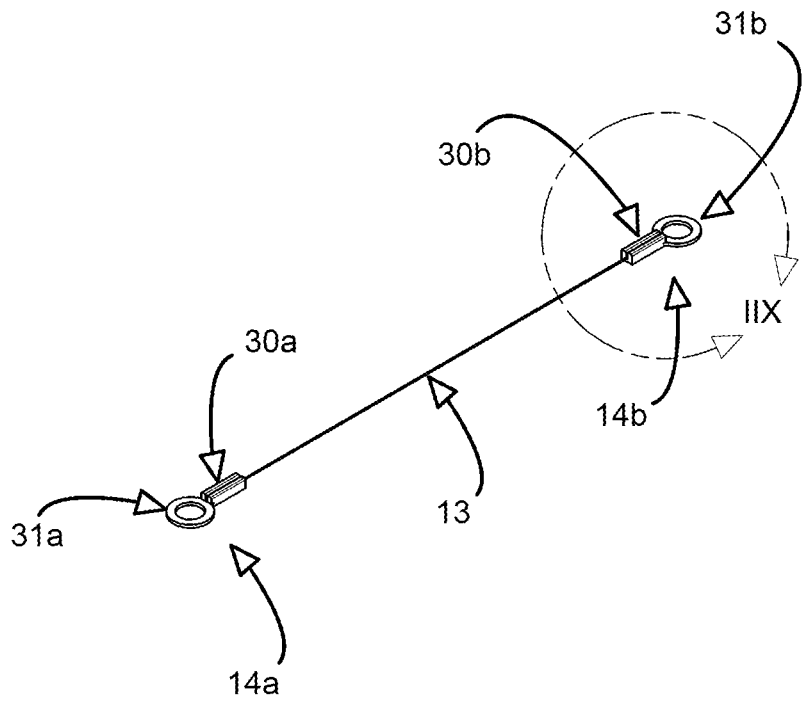
FIG. 7 is a top front perspective view of an actuator wire assembly including an actuator wire and the actuator wire attachments, in accordance with one embodiment.
Figure 8A:
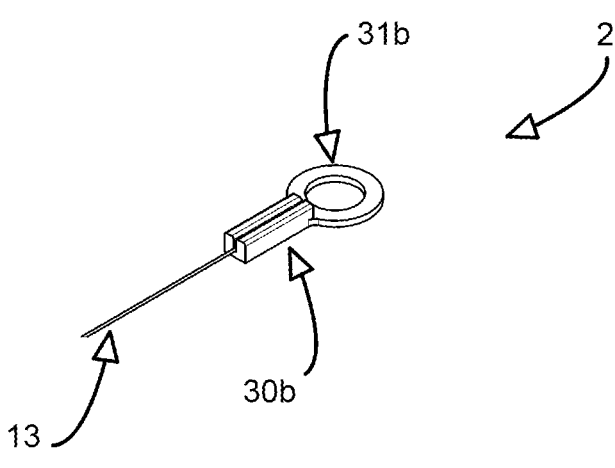
FIG. 8A is an enlarged portion, taken from area IIX, of the fishing lure assembly as illustrated in FIG. 7.
Figure 8B:
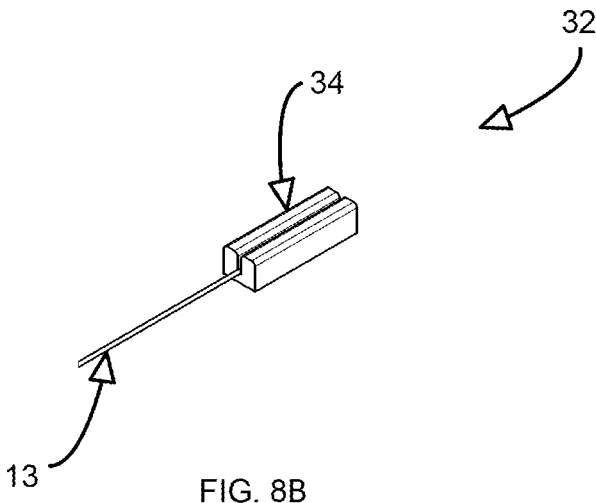
FIG. 8B is an enlarged portion, taken from area IIX, of the fishing lure assembly as illustrated in FIG. 7, in accordance with another attachment method.
Figure 8C:
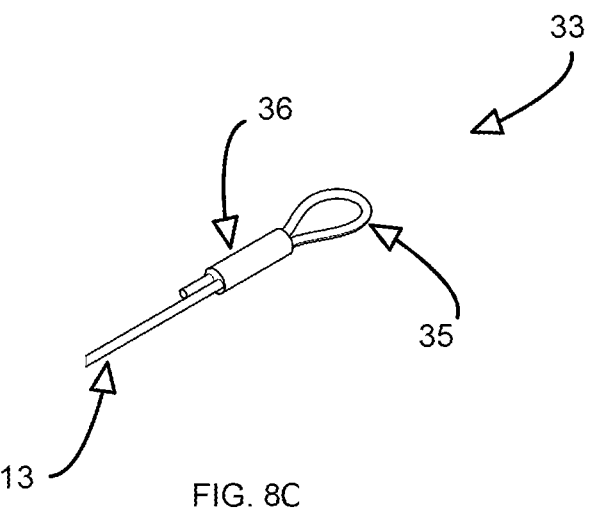
FIG. 8C is an enlarged portion, taken from area IIX, of the fishing lure assembly as illustrated in FIG. 7, in accordance with another attachment method.

The actuator wires 13 and 24 both comprise actuator wire attachments, restively 14a, 14b and 25a, 25b. The actuator wire attachment 14a is composed of two section: the wire crimp 30a and an attachment ring 31a, shown on FIG. 7. The wire crimp 30a secure the actuator wire attachment 14a to the actuator wire 13. The attachment ring 31a is meant to assemble the wire attachment 14a to the flexible non-compressive base 9, toward the lure head 28 side, via the rivet 26 or by other means as screws, bolt and nut, glue, weld or any other. The actuator wire attachment 14b is composed of two section: the wire crimp 30b and an attachment ring 31b, shown on FIG. 8. The wire crimp 30b secure the actuator wire attachment 14b to the actuator wire 13. The attachment ring 31b is meant to assemble the wire attachment 14b to the flexible non-compressive base 9, toward the lure tail 29 side, via the rivet 15. The actuator wire attachment 25a and 25b perform the same function in relation with the actuator wire 24. The actuator wire attachments 14a, 14b, 25 and 25b can be of different types: ring wire attachment 27 as shown in FIG. 8A, barrel wire attachment 32 shown in FIG. 8B or loop wire attachment 33 as shown in FIG. 8C. Referring to FIG. 8B, the barrel wire attachment 32 is composed of barrel 34 performing two functions: securing the actuator wire attachment 32 to the actuator wire 13 and is a means to assemble the wire attachment 32 to the flexible non-compressive base 9 by locating the barrel 34 into a cavity (or a protuberance or an embedding) of the flexible non-compressive base 9 or by other securing means as glue, weld or any other. The loop wire attachment 33 is composed of two section: the wire crimp 36 and an attachment loop 35, shown on FIG. 8C. The wire crimp 36 secure a loop made by the actuator wire 13 folding back on it self. The attachment loop 35 is meant to assemble the wire attachment 33 to the flexible non-compressive base 9 via the rivet 26 or by other means as screws, bolt and nut, glue, weld or any other. The attachment types herebefore described are meat as examples but can be replace by any attachment a person skilled in the art could think of.

Referring again to FIGS. 1 to 6, the lure body 2 is made of a flexible material such as but not limited to: silicone, rubber, elastomer, EPDM, neoprene, viton, nitrile, butyl, synthetic rubber, PVC, thermoplastic elastomers, polyurethane, urethane. The animated fishing lure 1 is equipped with: a fishing line attachment eyelet centered lengthwise at the lure top 47; two mono hook 5 and 4 respectively located on the lure head 28 and between the fishing line attachment eyelet 7 and the lure tail 29; and one treble hook 20 centered lengthwise at the lure bottom 46. The fishing line attachment eyelet 7, the treble hook 20 and the two mono hook 4 and 5 can either be attached to the flexible non-compressive base 9 or attached to the lure body 2 or independent. The fishing line 6 coming from the fishing rod (not shown) is attached to the fishing line eyelet 7. The treble hook 20 is constructed of three individuals hook 3a, 3b and 3c. The hooks configuration herebefore described are meant as examples but can be replaced by any hook combination, single or multiple hook (either mono, double, or treble), or any other hook combination that a skilled person would consider to be suitable for use with the present animated fishing lure 1.

Figure 9A:
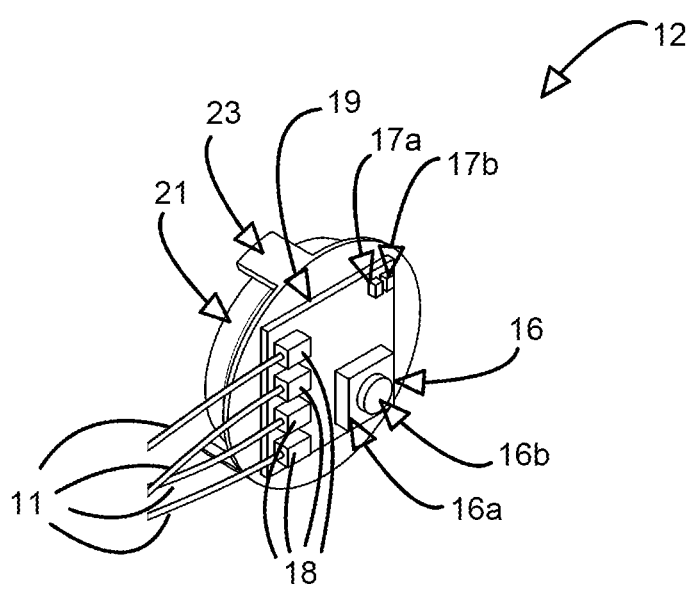
FIG. 9A is an enlarged portion, taken from area IXA, of the fishing lure assembly as illustrated in FIG. 3.
Figure 9B:
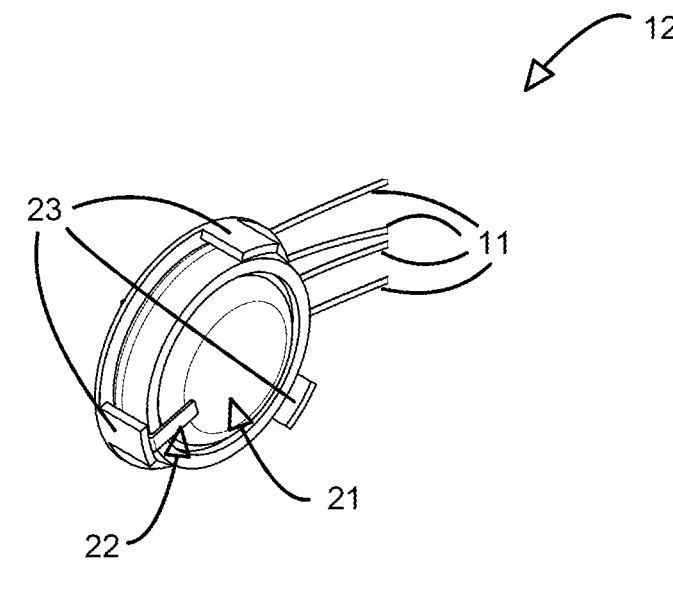
FIG. 9B is an enlarged portion, taken from area IXB, of the fishing lure assembly as illustrated in FIG. 2, with lure body removed.

Turning to FIGS. 9A and 9B, the controller 12 include a printed circuit board 19 (PCB) and a battery 21. The controller 12 function is to control the time intensity and interval of the electrical current applied through each of the actuator wires 13 and 24. By alternating electrical currents through the actuator wires 13 and 24 at a given intervals each said elements are alternatively heated and contracted bending the animated fishing lure 1 from a right bent position showed in FIG. 4B to a left bent position shown in FIG. 4C repeatedly creating an oscillating motion whereby the animated fishing lure 1 is imitating a live fish or any other live animal or reptile it is meant to imitate. The circuit board 19 comprise a commutator 16, wire connectors 18, and 2 indicator lights 17a and 17b. The commutator 16 main function is to activate the controller 12 but could be used to serve other functions (ex: change actuation mode or actuation speed, etc.) and is composed of a push button 16a and a commutator housing 16b. The wire connectors 11 secure the wires 11 connecting the controller 12 to each of the actuator wires 13 and 24. The indicator lights 17a and 17b are multicolor light emitting diode (LED) used to indicated the lure is powered ON but could also serve multiple other functions example: communicate system status, battery level, etc. The battery 21 is maintain into position onto the controller 12 by three battery locating tabs 23 tabs and one conductive tab 22. The conductive tab 22 is also used to conduct power from the battery pole facing outward (could be positive or negative pole). The controller 12 herebefore describe is meant as an example and any other controller configuration or any alternative power source that a skilled person would consider to be suitable for use with the present animated fishing lure 1.

Figure 10:
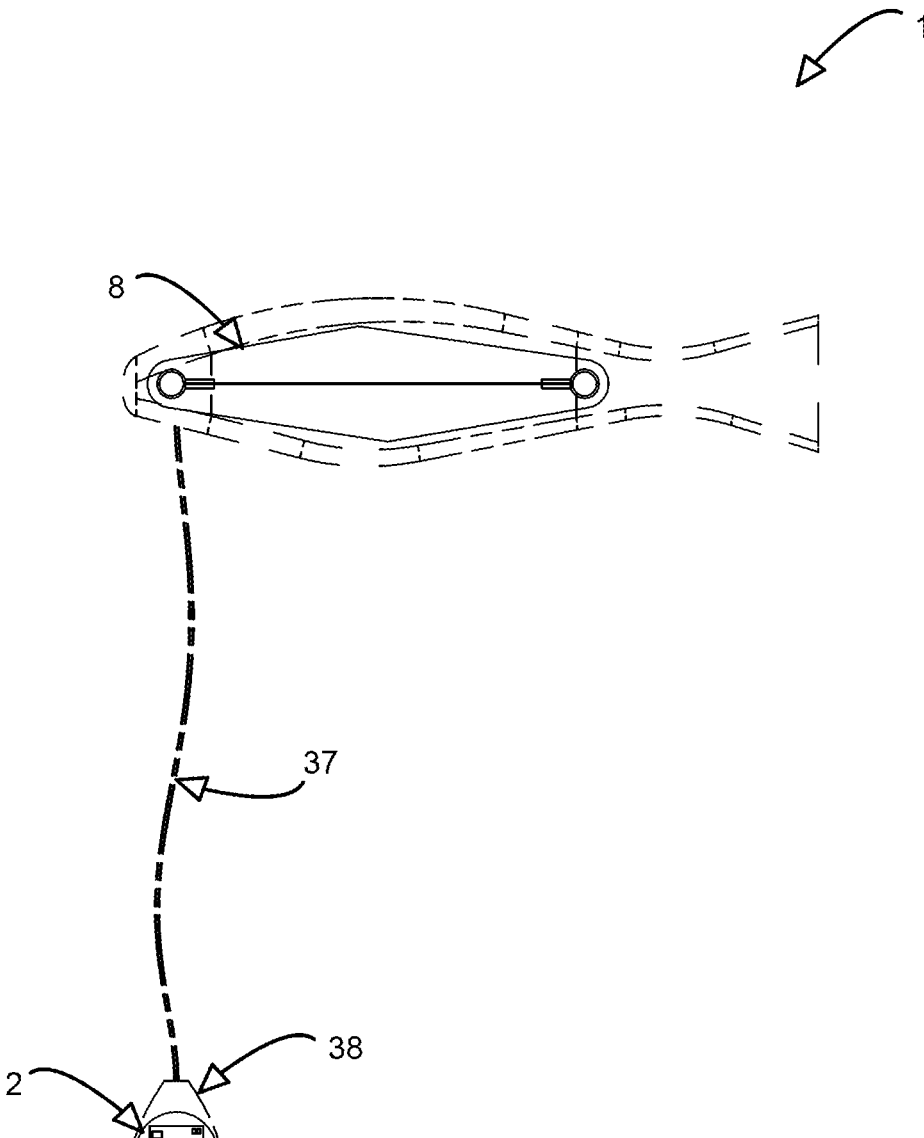
FIG. 10 is a side view of an actuated fishing lure system, in accordance with another embodiment.

Now turning to FIG. 10, there is shown the animated fishing lure 1, in accordance with another embodiment. In this embodiment the controller 12 is located externally from the animated fishing lure 1. The controller 12 is comprise in a housing 38 and connected to the shape memory alloy (SMA) actuator system 8 via the electrical wire 37. In the illustrated embodiment the housing 38 can serve as a weight for a said fishing rig arrangement (example: drop shot rig arrangement).

Figure 11:
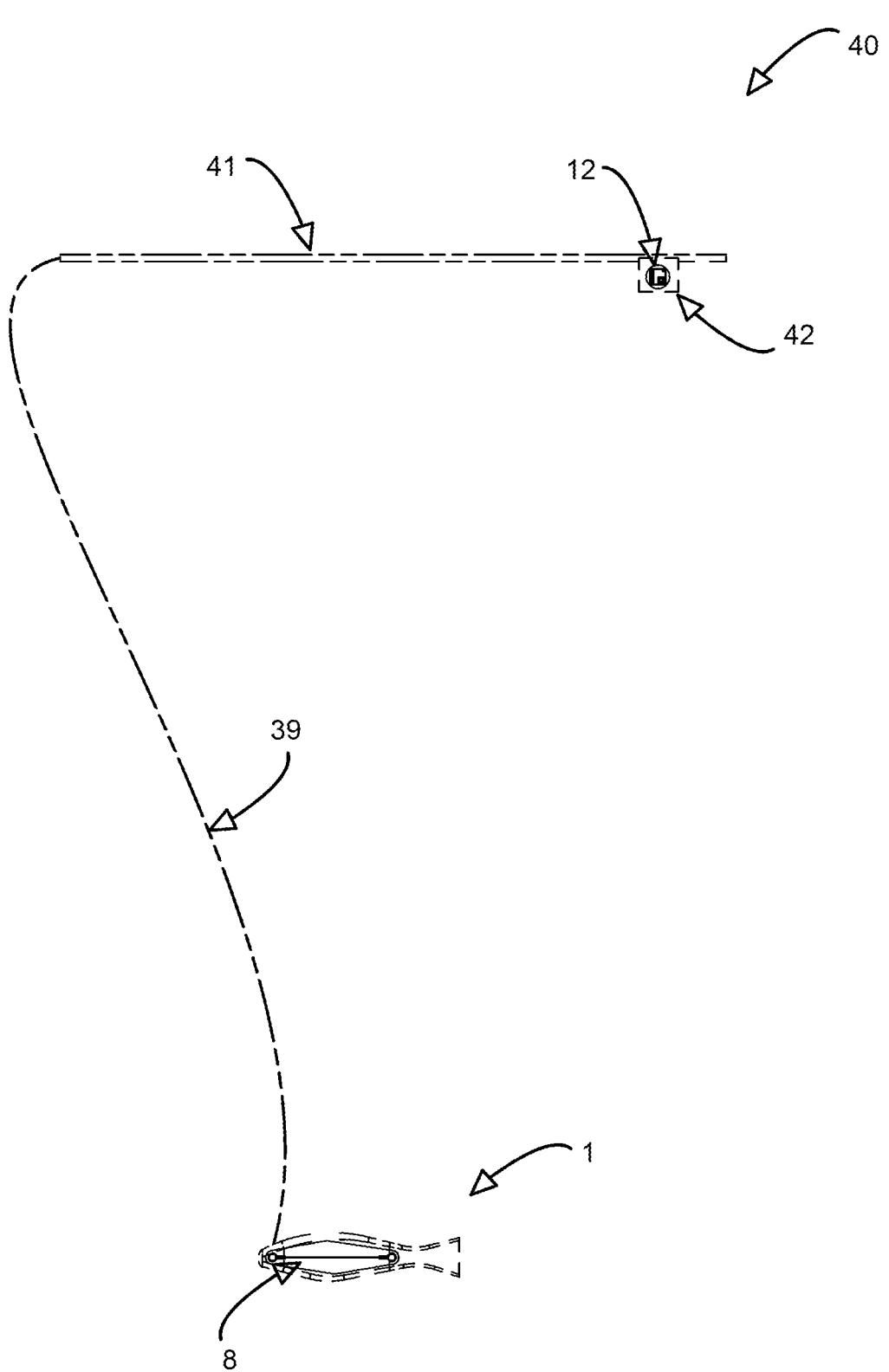
FIG. 11 is a side view of an actuated fishing lure system, in accordance with another embodiment.

Now turning to FIG. 11, there is shown the animated fishing lure 1, in accordance with another embodiment. In yet another embodiment the controller 12 is located externally from the animated fishing lure 1. The controller 12 is comprise in a housing 42 and connected to the shape memory alloy (SMA) actuator system 8 via the electrical wire 39. In the illustrated embodiment the housing 42 is located on the fishing rod 40 and attached to the rod 41.

In yet another embodiment, the shape memory alloy (SMA) actuator system 8 comprised within the lure body 2 could includes a flexible non-compressive base 9 made of a shape memory alloy (SMA) or any other material that shares at least one of the properties of the shape memory alloys (SMA). The said shared property includes to have the capacity to be deformed when cold but return to its pre-deformed shape when heated. Inducing an electrical current through flexible non-compressive base 9 generates heat due to the electrical resistance. The heat generated by the electrical current results in a deformation of the base to a pre-deformed shape causing it to bend toward the right side 44 as best seen in FIG. 4B. Opposingly, by stopping electrical current flow through flexible non-compressive base 9 the base is allowed to cools. The cooling generated by the stop of electrical current flow results in a return of the flexible non-compressive base 9 to its initial shape causing it to bend toward the left side 45 as best seen in FIG. 4C. By alternating electrical currents through the flexible non-compressive base 9 at a given intervals the base is alternatively heated and cooled bending the animated fishing lure 1 from a right bent position showed in FIG. 4B to a left bent position shown in FIG. 4C repeatedly creating an oscillating motion whereby the animated fishing lure 1 is imitating a live fish or any other live animal or reptile it is meant to imitate.

It will be understood that the present animated fishing lure 1 presents a number of advantages when compared to existing fishing lures.

For example, in contrast to conventional fishing lure, the animated fishing lure 1 imitating a live bait, thereby eliminating the need for real live bait for fishing where in some regions the use of such live bait is prohibited.

Furthermore, in contrast to other fishing lures, the animated fishing lure 1 does not require any motor or any rotating element to create the oscillating motion from a right bent position showed in FIG. 4B to a left bent position shown in FIG. 4C repeatedly whereby the animated fishing lure 1 is imitating a live fish or any other live animal or reptile it is meant to imitate. This simplifies the animated fishing lure 1, and further allows for simpler fabrication while minimizing the cost manufacturing.

It will also be appreciated that the present animated fishing lure 1 is particularly well adapted for replacing live bait or a conventional fishing lure when fishing with a static line technique. Specifically, it will be appreciated that it is particularly well suited for tip-up fishing during winter ice fishing. It will particularly be appreciated by fisherman to replace live bait in area where those are prohibited.

To replace the existing fishing lure with this animated fishing lure 1 you simply need to remove the conventional lure from the fishing line and tied up the animated fishing lure 1 to the fishing line.

It will further be appreciated that the arrangements described above are merely provided as examples, and that various alternative configurations may be considered. For example, instead of comprising actuator wires 13 and 24 which can contract to create the oscillating motion from a right bent position to a left bent position repeatedly the shape memory alloy (SMA) actuator system 8 could instead include be made of a shape memory alloy flexible base replacing the flexible non-compressive base 9, without any additional actuator wires requires. In this embodiment the said shape memory alloy flexible base replacing the flexible non-compressive base 9 have the capacity to be deformed when cold but return to its pre-deformed shape when heated; the element undergoing transition from martensite state to austenite state upon heating and from austenite state to martensite state upon cooling. In this embodiment the lure would then have only two positions wherebefore describe as right bent and left bent (no straight position as shown in FIG. 4A).

Furthermore, while the above description is directed to fish shape with a said hook configuration, it will be understood that similar lure shape and hook configuration could be use. For example, a minnow, a shad, a mullet, a grub, a worm, a leech, a crayfish, a shrimp, an eel or any other lure shape with any hook combination, single or multiple hook (either mono, double, or treble), or any other hook combination that a skilled person would consider to be suitable for use with the present animated fishing lure 1

While the above description provides examples of the embodiments, it will be appreciated that some features and/or functions of the described embodiments are susceptible to modification without departing from the spirit and principles of operation of the described embodiments. Accordingly, what has been described above has been intended to be illustrative and non-limiting and it will be understood by persons skilled in the art that other variants and modifications may be made without departing from the scope of the invention as defined in the claims appended hereto.

The invention claimed is:

1. An animated fishing lure, comprising:
an actuator system for animating the animated fishing lure; and
a lure body embedding the actuator system;
wherein the actuator system includes
a base member embedded in the lure body;
at least one actuating element secured to the base member at two spaced apart locations therealong and disposed aside and parallel to the base member, the actuating element being electrically connected to an electrical power source;
a controller electrically connected between the actuating element and the electrical power source; and
an activation circuit electronically connected to the controller allowing the system be activated or deactivated externally to the body:
wherein the at least one actuating element includes a pair of elongate shape memory alloy (SMA) elements in the form of wires provided on opposite sides of the base.

2. The animated fishing lure as claimed in claim 1, wherein the base member is made of a non-conductive flexible material that is incompressible.

3. The animated fishing lure as claimed in claim 2, wherein, in operation, the wires are electrically powered in alternative intervals whereby the wires combined with the base member being flexible but incompressible, actuate the lure body therefore animating thereof.

4. The animated fishing lure as claimed in claim 1, wherein the electrical power source is retained by the body.

5. The animated fishing lure as claimed in claim 1, wherein the electrical power source is retained externally to the body.

6. The animated fishing lure as claimed in claim 5 wherein the electrical power source is retained near a fishing rod reel area.

7. The animated fishing lure as claimed in claim 5 wherein the electrical power source is retained by an object attached to the fishing line used as additional weight for the animated fishing Jure.

8. The animated fishing lure as claimed in claim 1, wherein the controller is retained by the body.

9. The animated fishing lure as claimed in claim 1, wherein the controller is retained externally to the body.

10. The animated fishing lure as claimed in claim 9, wherein the controller is retained near a fishing rod reel area.

11. The animated fishing lure as claimed in claim 9, wherein the controller is retained by an object attached to the fishing line used as additional weight for the animated fishing lure.

12. The animated fishing lure as claimed in claim 1, wherein the wires each define opposed wire ends secured to the base at spaced apart locations therealong with the wire being movable relative to the base between the wire ends.

13. The animated fishing lure as defined in claim 1, wherein the actuating element is operatively coupled to the base member such that when tension is generated by contraction of the actuating element, the actuating element acts on the base to cause it to bend.

14. An animated fishing lure comprising:
a lure body movable between body first and second configurations;
a base member embedded in the lure body, the base member defining opposed first and second surfaces, the base member being deformable between base first and second configurations, the lure body being respectively in the body first and second configurations when the base member is in the base first and second configurations;
first and second wires each made of a shape memory alloy running along respectively the first and second surfaces parallel thereto;
an electrical power source; and
a controller operative for selectively allowing current to flow from the electrical power source through one of the first and second wires;
wherein the first and second wires are configured to shorten when current flows therethrough, so that passing a current through one of the first and second wires shortens the one of the first and second wires to deform the base respectively to the base first and second configurations.

15. The animated fishing lure as defined in claim 14, wherein the base member includes a plate, and the base first and second configurations correspond to bending of the plate in opposite directions.

16. The animated fishing lure as defined in claim 14, wherein the wires are operatively coupled to the base member such that when tension is generated by wire contraction, the wire acts on the base to cause it to bend.

17. An animated fishing lure, comprising:
an actuator system for animating the animated fishing lure; and
a lure body embedding the actuator system;
wherein the actuator system includes
a base member embedded in the lure body;
at least one actuating element secured to the base member at two spaced apart locations therealong and disposed aside and parallel to the base member, the actuating element being electrically connected to an electrical power source;
a controller electrically connected between the actuating element and the electrical power source; and
an activation circuit electronically connected to the controller allowing the system be activated or deactivated externally to the body;
wherein the base member is made of a non-conductive flexible material that is incompressible.

* * * * *